US012502058B2

(12) United States Patent
Ng et al.

(10) Patent No.: US 12,502,058 B2
(45) Date of Patent: Dec. 23, 2025

(54) LARYNGOSCOPE BLADE WITH GLARE-REDUCING FEATURES

(71) Applicant: COVIDIEN LP, Mansfield, MA (US)

(72) Inventors: Michael Ng, Kln (HK); Jürgen Van Vlem, Tsim Sha Tsui (HK); Hoi Cheung Wong, Tsing Yi (HK)

(73) Assignee: Covidien LP, Mansfield, MA (US)

( * ) Notice: Subject to any disclaimer, the term of this patent is extended or adjusted under 35 U.S.C. 154(b) by 488 days.

(21) Appl. No.: 17/579,148

(22) Filed: Jan. 19, 2022

(65) Prior Publication Data

US 2022/0257092 A1     Aug. 18, 2022

Related U.S. Application Data

(60) Provisional application No. 63/150,933, filed on Feb. 18, 2021.

(51) Int. Cl.
| A61B 1/267 | (2006.01) |
| A61B 1/00 | (2006.01) |
| A61B 1/05 | (2006.01) |
| A61B 1/06 | (2006.01) |

(52) U.S. Cl.
CPC ......... *A61B 1/267* (2013.01); *A61B 1/00052* (2013.01); *A61B 1/00071* (2013.01); *A61B 1/05* (2013.01); *A61B 1/06* (2013.01)

(58) Field of Classification Search
CPC . A61B 1/2673; A61B 1/2676; A61B 1/00066; A61B 1/00; A61B 1/05; A61B 1/267; A61B 1/24; A61B 1/00684; A61B 1/07
See application file for complete search history.

(56) References Cited

U.S. PATENT DOCUMENTS

| 3,848,587 A * | 11/1974 | McDonald ............... A61B 1/07 |
| | | 600/187 |
| 4,583,528 A * | 4/1986 | Bauman ................. A61B 1/267 |
| | | 362/296.07 |
| 5,873,818 A * | 2/1999 | Rothfels ................ A61B 1/267 |
| | | 600/188 |
| 9,095,298 B2 * | 8/2015 | Ashcraft ............ A61B 1/00048 |
| 2011/0130627 A1 | 6/2011 | McGrail et al. |
| 2011/0130632 A1 * | 6/2011 | McGrail ............ G02B 23/2446 |
| | | 600/188 |
| 2013/0189646 A1 * | 7/2013 | Hochman ............... A61C 19/04 |
| | | 433/174 |

(Continued)

FOREIGN PATENT DOCUMENTS

| EP | 1025796 A1 | 8/2000 |
| WO | WO-2015179708 A1 * | 11/2015 ............... A61B 1/07 |

OTHER PUBLICATIONS

International Search Report for International Application No. PCT/US2022/015557 mailed Apr. 29, 2022 (4 pages).

(Continued)

*Primary Examiner* — Julianna N Harvey
*Assistant Examiner* — Holly Joanna Lane

(57) ABSTRACT

A laryngoscope system includes a light source configured to emit light, a camera configured to obtain image data, and a blade having a channel sized to fit over the light source and the camera. The channel includes a closed end surface, a lateral surface, and a texture or a coating applied to the lateral surface.

19 Claims, 4 Drawing Sheets

(56) References Cited

U.S. PATENT DOCUMENTS

| | | | | |
|---|---|---|---|---|
| 2014/0160261 A1* | 6/2014 | Miller | ............... | A61B 1/05 |
| | | | | 348/77 |
| 2016/0374546 A1* | 12/2016 | Berbee | ............... | A61B 1/05 |
| | | | | 600/109 |
| 2019/0133430 A1* | 5/2019 | Inglis | ............... | A61B 1/00052 |
| 2019/0254771 A1* | 8/2019 | Swift | ............... | A61B 1/00032 |
| 2020/0297204 A1* | 9/2020 | Vivenzio | ............ | A61B 1/0625 |
| 2022/0061648 A1* | 3/2022 | Vasan | ............... | A61B 1/042 |

OTHER PUBLICATIONS

International Written Opinion for International Application No. PCT/US2022/015557 mailed Apr. 29, 2022 (4 pages).

\* cited by examiner

LARYNGOSCOPE BLADE WITH GLARE-REDUCING FEATURES

CROSS-REFERENCE TO RELATED APPLICATIONS

The present application claims priority to U.S. Provisional Patent Application Ser. No. 63/150,933, filed Feb. 18, 2021, and is hereby incorporated by reference.

BACKGROUND

The present disclosure relates generally to medical devices and, more particularly, to a laryngoscope blade with one or more glare-reducing features.

This section is intended to introduce the reader to various aspects of art that may be related to the present disclosure, as described and/or claimed below. This discussion is believed to be helpful in providing the reader with background information to facilitate a better understanding of the various aspects of the present disclosure. Accordingly, it should be understood that these statements are to be read in this light, and not as admissions of prior art.

During treatment of a patient, a tracheal tube or other medical device may be used to control a flow of air, food, fluids, or other substances into the patient. For example, the tracheal tube may be used to control the flow of air or other gases through a trachea of the patient and into the lungs of the patient during a mechanical ventilation procedure. The tracheal tube may be an endotracheal (ET) tube, a tracheostomy tube, or a transtracheal tube. A laryngoscope is commonly used to facilitate insertion of the tracheal tube into the trachea of the patient. The laryngoscope may include a light source to permit visualization of the airway of the patient to facilitate intubation. A video laryngoscope may also include an imager, such as a camera, to obtain an image (e.g., moving image) of the airway of the patient during the intubation.

SUMMARY

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In one embodiment, a laryngoscope system includes a light source configured to emit light, a camera configured to obtain image data, and a blade having a channel sized to fit over the light source and the camera. The channel includes a closed end surface, a lateral surface, and a texture or a coating applied to the lateral surface.

In one embodiment, a laryngoscope system includes a body having a handle and an arm. The laryngoscope system also includes a light source positioned at a distal end portion of the arm, a camera positioned at the distal end portion of the arm, and a blade having a channel sized to fit over the arm. The blade also includes a closed end surface that is configured to enable light from the light source to pass through the closed end surface of the channel and to enable the camera to obtain image data through the closed end surface of the channel while the channel is fitted over the arm. The blade further includes a first lateral surface and a second lateral surface positioned on opposite lateral sides of the closed end surface. The blade further includes a texture applied to the closed end surface, the first lateral surface, the second lateral surface, or any combination thereof.

In one embodiment, a blade for a video laryngoscope includes a blade body that defines a channel sized to receive a camera stick of the video laryngoscope. The blade also includes a closed end surface at a distal end of the channel. The blade further includes a lateral surface of the channel that extends from a proximal end of the channel to the closed end surface at the distal end of the channel. The blade further includes a texture or a coating applied to the lateral surface.

Features in one aspect or embodiment may be applied as features in any other aspect or embodiment, in any appropriate combination. For example, any one of system, laryngoscope, controller, introducer, or method features may be applied as any one or more other of system, laryngoscope, monitor, or method features.

BRIEF DESCRIPTION OF THE DRAWINGS

Advantages of the disclosed techniques may become apparent upon reading the following detailed description and upon reference to the drawings in which.

DETAILED DESCRIPTION OF SPECIFIC EMBODIMENTS

Figure 1:
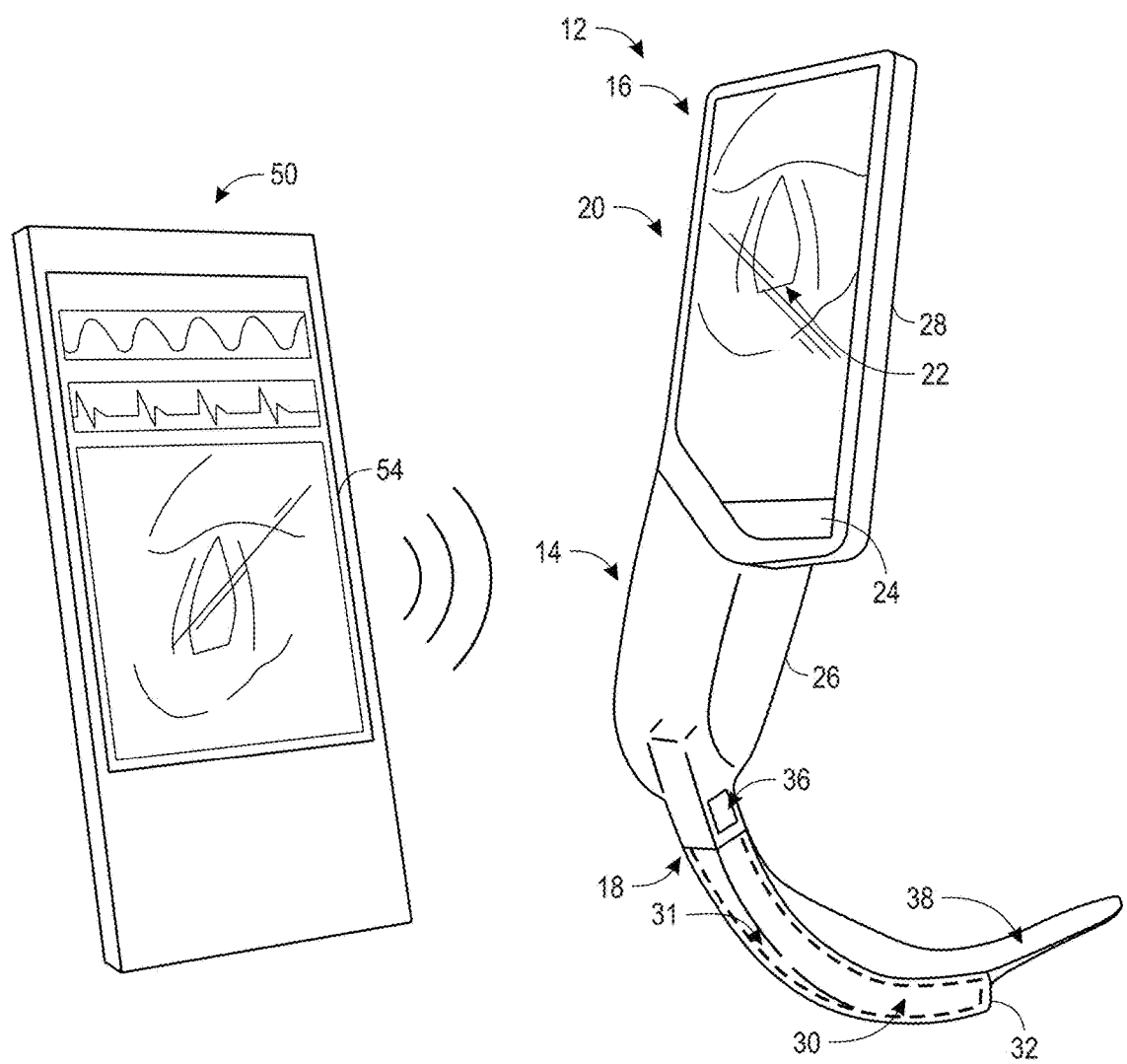
FIG. 1 is a perspective view of a laryngoscope system having a laryngoscope communicatively coupled to a medical monitor, in accordance with an embodiment of the present disclosure.

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A medical professional (e.g., clinician, operator, user) may use a laryngoscope to view a patient's oral cavity to facilitate insertion of a tracheal tube (e.g., endotracheal tube, tracheostomy tube, or transtracheal tube) into the patient's trachea during an intubation procedure. Certain laryngoscopes may provide an indirect view of the patient's oral cavity via prisms, lenses, reflective surfaces, or the like. However, it is presently recognized that it may be desirable to position a camera on a portion of the laryngoscope that is inserted into the patient's oral cavity to obtain an image (e.g., moving image) of the patient's oral cavity. The image may then be displayed on a display screen during the intubation procedure to enable the medical professional to visualize the patient's oral cavity and to facilitate insertion of the tracheal tube.

Accordingly, the disclosed embodiments generally relate to a laryngoscope system that includes a laryngoscope with a body (e.g., reusable body) having an elongate portion (e.g., a camera stick) that supports a camera, a display portion with a display screen that is configured to display an image obtained by the camera, and a handle portion with a handle that is configured to be gripped by the medical professional during an intubation procedure. A blade for the laryngoscope is provided as a removable cover (e.g., disposable, reusable, or reprocessable cover or sleeve) that fits over the elongate portion of the body of the laryngoscope. Together, the blade and the elongate portion of the body may form an insertable assembly that is configured to be inserted into and to manipulate the patient's oral cavity.

The laryngoscope may be operated with a single hand (such as the medical professional's left hand), while another hand (such as the medical professional's right hand) grips the tracheal tube and guides it forward into the patient's oral cavity. The medical professional may view advancement of the tracheal tube on the display screen in order to guide the tracheal tube into its proper position. The medical professional may adjust the viewing angle by manipulating and orienting the laryngoscope within the patient's oral cavity to account for patient-to-patient variability of airway anatomy. The disclosed embodiments include the display screen integrated with the laryngoscope in order to place the image obtained by the camera within a natural viewing angle of the medical professional during the intubation procedure. In this way, the medical professional may easily view the image obtained by the camera, while also maintaining direct visualization of the patient's oral cavity to assist in the intubation procedure. However, it should be appreciated that the display screen may instead be separate from the laryngoscope, and the image obtained by the camera may be transmitted to the display screen via a wired or wireless connection.

Regardless of a location of the display screen, clarity of the image obtained by the camera and displayed on the display screen is important to facilitate appropriate placement of the tracheal tube and efficient completion of the intubation procedure. Accordingly, present embodiments include one or more glare-reducing features on the blade of the laryngoscope. For example, the one or more glare-reducing features may include a texture or a coating on a surface of the blade. The one or more glare-reducing features may be configured to block light entry into an aperture of the camera to thereby reduce glare in the image.

With the foregoing in mind, FIG. 1 is a perspective view of an embodiment of a laryngoscope system 10. The laryngoscope system 10 includes a laryngoscope 12 with a body 14, which may be ergonomically shaped as a handle to facilitate grip by a user (e.g., medical professional, clinician). The body 14 extends from a proximal end 16 to a distal end 18 and includes a display assembly 20 having a display screen 22. As illustrated, the display assembly 20 is coupled to the proximal end 16 and extends laterally from the body 14, such that a lateral portion 24 of the display assembly 20 extends outwardly away from a housing 26 of the body 14. As shown, the display assembly 20 may be formed as an integrated piece with the body 14, such that an exterior of a housing 28 of the display assembly 20 and an exterior of the housing 26 of the body 14 are formed from the same material. However, in other embodiments, the display assembly 20 may be formed as a separate piece and adhered or otherwise coupled to the body 14. The display assembly 20 may be fixed relative to the body 14 or may be movable relative to the body 14, such that an orientation and/or a position of the display assembly 20 may be adjusted by the user.

The laryngoscope 12 also includes a camera stick 30, which may be coupled to the body 14 at the distal end 18 of the body 14. The camera stick 30 may be fixedly coupled to the body 14 (e.g., via welded joints), or the camera stick 30 may be removably coupled to the body 14 (e.g., via one or more fasteners) to facilitate access to an interior of the camera stick 30 for repair or replacement operations, for example. As discussed in more detail below, the camera stick 30 may be formed as an elongate extension or arm (e.g., metal, polymeric) that houses an image acquisition device (e.g., a camera) and a light source. The camera stick 30 may also house electrical cables or leads that couple the camera and the light source to electrical components in the body 14, such as the display assembly 20, a computer (e.g., processing components), and a power source. The electrical cables provide power and drive signals to the camera and light source and relay data signals back to the computer in the body 14. In certain embodiments, these signals may be provided wirelessly in addition to or instead of being provided through the electrical cables.

In use to intubate a patient, a blade 38 is positioned over the camera stick 30 (e.g., by sliding onto the camera stick 30 like a sleeve). The blade 38 includes a blade body that defines an internal channel or passage 31 sized to accommodate the camera stick 30 and to position a camera of the camera stick 30 at a suitable angle to visualize the patient's oral cavity. In the depicted arrangement, the passage 31 terminates at a closed end surface 32 positioned such that a field of view of the camera is oriented through the closed end surface 32. The blade 38 is at least partially transparent (such as transparent at least at a portion of the closed end surface 32 or transparent along an entirety of the blade 38) to permit the camera of the camera stick 30 to capture images through the blade 38. The camera and the light source of the camera stick 30 facilitate the visualization of a tracheal tube or other instrument inserted into the patient's oral cavity. For example, the images from the camera of the camera stick 30 may be displayed on the display screen 22. As discussed in more detail below, the blade 38 may include one or more glare-reducing features, such as a texture or a coating, on one or more surfaces of the blade 38 (e.g., applied to one or more surfaces of the passage 31 of the blade 38, such as one or more surfaces along the passage 31 of the blade 38 or surrounding the passage 31 of the blade 38) in order to provide clarity and reduced glare in the images from the camera.

The laryngoscope 12 may be cleaned and reused for multiple patients. The blade 38 protects certain components, such as the camera stick 30, which would otherwise be exposed to the environment of the patient's oral cavity and/or potentially contact tracheal or oral tissue of the patient. The distal end 18 of the body 14 of the laryngoscope 12 may include an attachment feature 36 to facilitate efficient removable or reversible coupling of the blade 38 to the body 14. For example, the attachment feature 36 may include a protrusion on the body 14, which fits into a recess or passageway formed in a corresponding portion of the blade 38. In certain embodiments, the blade 38 may be configured as a disposable single-use device. Accordingly, the laryngoscope 12 may be provided as a kit that includes one or more blades 38. The blade 38 may be selected to be an appropriate size and shape based on an assessment of the patient and/or according to a type of intubation procedure and/or based on user preference.

It should be appreciated that the laryngoscope system 10 may include one or more other devices or systems, such as a monitor 50 (e.g., a medical monitor), a computing system, and/or a hospital data storage system. For example, in an embodiment, in response to detection of the monitor 50 by communication circuitry of the laryngoscope 12, the laryngoscope 12 communicates with the monitor 50 to pair with the monitor 50 to transmit the images to the monitor 50 (e.g., wirelessly stream the images in substantially real-time). As shown, the monitor 50 includes a display screen 54 that provides the images to the user. In certain embodiments, in response to pairing the laryngoscope 12 with the monitor 50, the monitor 50 transmits data (e.g., patient data) from a memory of the monitor 50 to the laryngoscope 12. The laryngoscope 12 and the monitor 50 may include communication circuitry (e.g., wireless transceivers) that are configured to establish wireless communication with one another using any suitable protocol.

Figure 2:
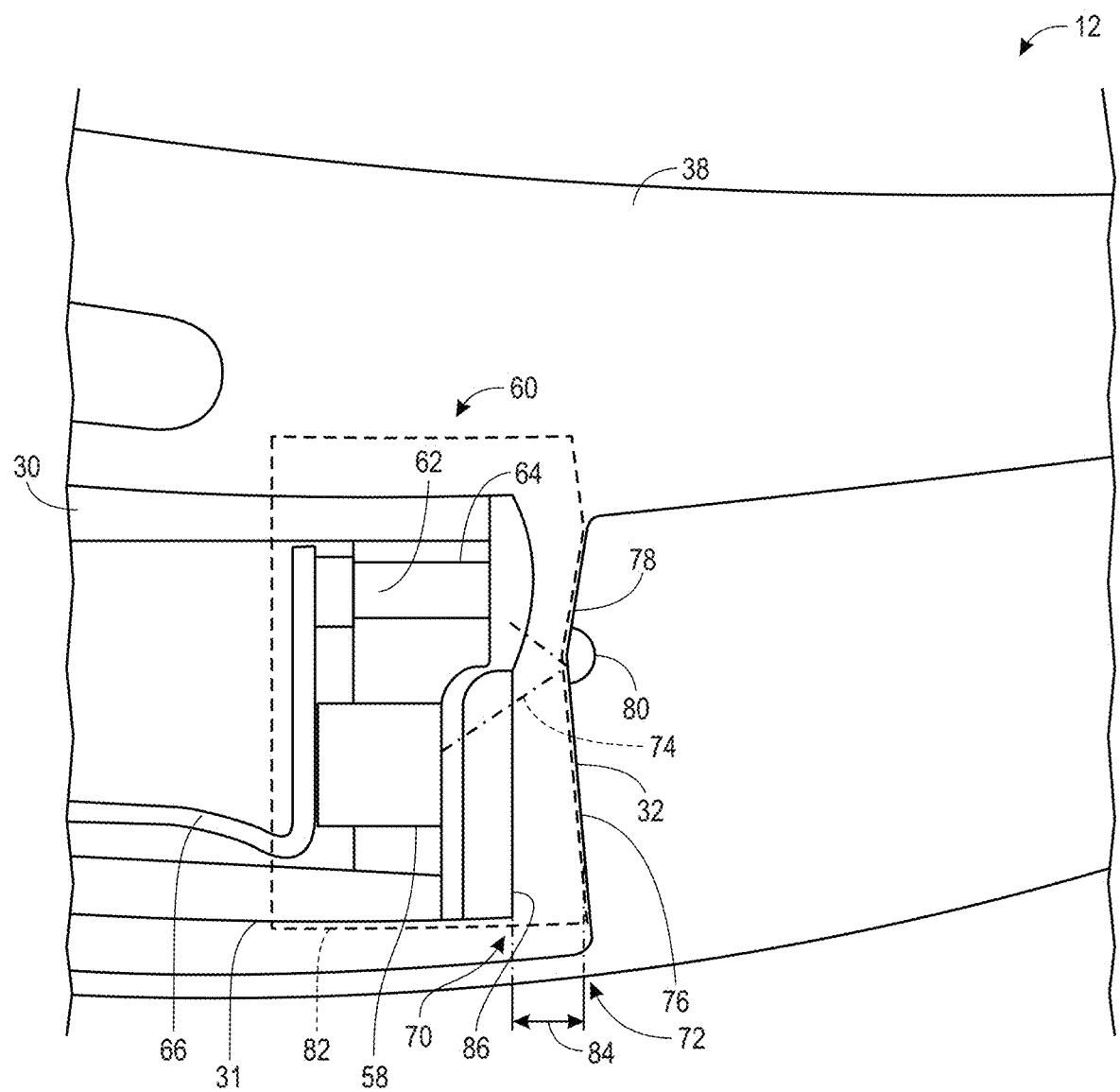
FIG. 2 is a side view of a portion of a blade that may be utilized as part of the laryngoscope of FIG. 1, in accordance with an embodiment of the present disclosure.

FIG. 2 is a side view of a portion the blade 38 of the laryngoscope 12. As shown, the camera stick 30 includes a camera 58, as well as a light source 60 with a light emitter 62 and a light pipe 64. The camera stick 30 supports electrical cables 66 that provide power and drive signals to the camera 58 and the light emitter 62 and that relay data signals (e.g., captured images) back to processing components in the body 14, which is shown in FIG. 1. The blade 38 is positioned to cover (e.g., to surround) at least a portion the camera stick 30. The blade 38 includes multiple surfaces, such as the closed end surface 32, a first lateral surface 70 (e.g., right side surface), and a second lateral surface 72. The first lateral surface 70 and the second lateral surface 72 are generally positioned on opposite lateral sides of the camera stick 30, and the closed end surface 32 extends laterally between the first lateral surface 70 and the second lateral surface 72. The passage 31 that receives and fits about the camera stick 30 terminates at the closed end surface 32.

As shown, the light emitter 62 and the light pipe 64 are positioned to emit light toward and through the closed end surface 32, and the camera 58 is positioned to capture images through the closed end surface 32. Without the one or more glare-reducing features disclosed herein, light from the light emitter 62 may be reflected by the closed end surface 32, the first lateral surface 70, the second lateral surface 72, and/or other surfaces of the blade 38 toward an aperture of the camera 58, which may result in substantial glare and/or reduced clarity in the images. For example, a dashed line 74 in FIG. 2 illustrates how a portion of the light from the light emitter 62 may be reflected by the closed end surface 32 toward the aperture of the camera 58.

However, as discussed in more detail below, the present embodiments may include one or more glare-reducing features, such as a texture or a coating, on at least a portion of the blade 38. For example, the one or more glare-reducing features may include the texture or the coating on a portion of the closed end surface 32, a portion of the first lateral surface 70, and/or a portion of the second lateral surface 72. The one or more glare-reducing features may reduce reflection of the light emitted by the light emitter 62 toward the aperture of the camera 58, and instead, the one or more glare-reducing features may increase diffusion (e.g., scatter) of the light emitted by the light emitter 62.

In the illustrated embodiment, the closed end surface 32 has a first portion 76 and a second portion 78 that are positioned at an angle 80 relative to one another. For example, the first portion 76 may extend along a first axis and the second portion 78 may extend along a second axis that is transverse to the first axis. However, it should be appreciated that the closed end surface 32 may be devoid of distinct portions that are positioned at the angle 80 relative to one another (e.g., an entirety of the closed end surface 32 may extend along the first axis or the second axis without the angle 80; the closed end surface 32 may be a planar surface).

The one or more glare-reducing features are not shown in FIG. 2 in order to more clearly illustrate the camera stick 30, the camera 58, and the light source 60 within the blade 38. However, an outline 82 in dashed lines represents one possible position of a first glare-reducing feature along the first lateral surface 70. As shown by the outline 82, the first glare-reducing feature may be positioned on the first lateral surface 70 so as to extend across or to cover a gap 84 between an end portion 86 of the camera stick 30 and the closed end surface 32 of the blade 38. A second glare-reducing feature along the second lateral surface 72 may also extend across or cover the gap 84 between the end portion 86 of the camera stick 30 and the closed end surface 32 of the blade 38.

Figure 3:
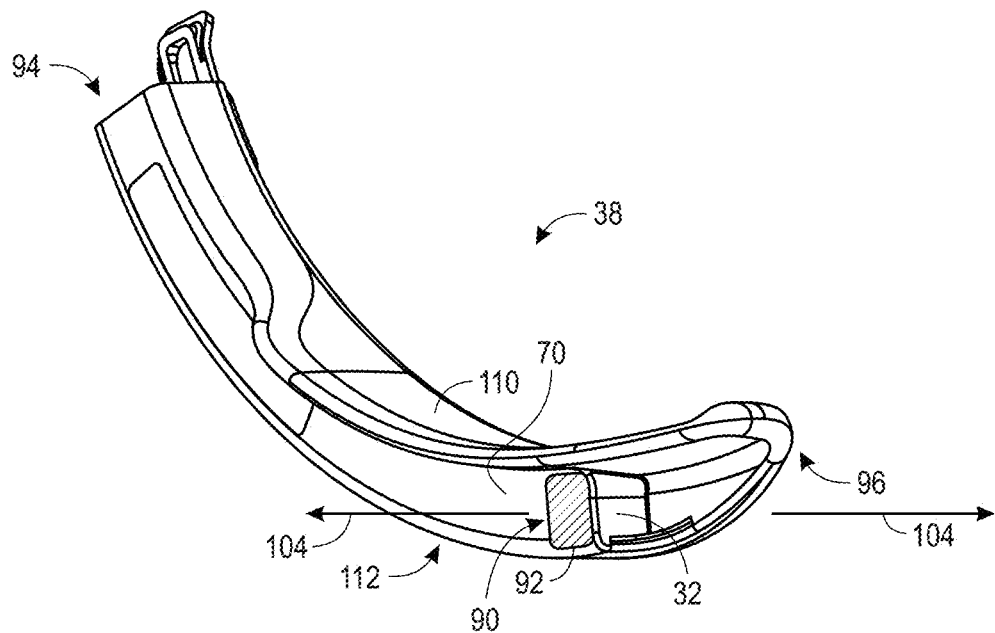
FIG. 3 is a perspective right side view of the blade FIG. 2, wherein the blade includes a first textured surface, in accordance with an embodiment of the present disclosure.

FIG. 3 is a perspective right side view of an embodiment of the blade 38, wherein the blade 38 includes a first glare-reducing feature 90 on the first lateral surface 70 of the blade 38. In the illustrated embodiment, the first glare-reducing feature 90 is a textured area 92 located across a portion of the first lateral surface 70 of the blade 38. The textured area 92 is positioned on the first lateral surface 70 of the blade 38 between a proximal end 94 (e.g., open end that is configured to receive the camera stick 30) and a distal end 96 of the blade 38. In certain embodiments, the textured area 92 is positioned on the first lateral surface 70 of the blade 38 between the closed end surface 32 (e.g., an intersection between the closed end surface 32 and the first lateral surface 70) and the proximal end 94 of the blade 38. Generally, the textured area 92 may be sized and positioned to diffuse the light emitted by the light emitter 62 of FIG. 2 to thereby reduce glare in the images captured by the camera 58 of FIG. 2.

Figure 4:
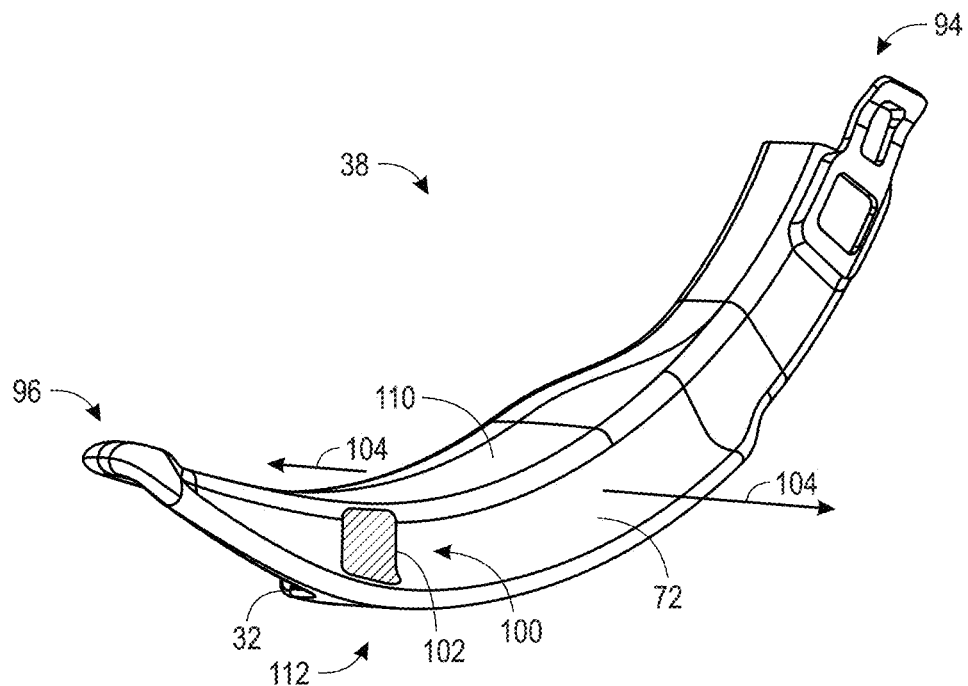
FIG. 4 is a perspective left side view of the blade FIG. 2, wherein the blade includes a second textured surface, in accordance with an embodiment of the present disclosure.

FIG. 4 is a perspective left side view of and embodiment of the blade 38, wherein the blade 38 includes a second glare-reducing feature 100 on the second lateral surface 72 of the blade 38. In the illustrated embodiment, the second glare-reducing feature 100 is a textured area 102 located across a portion of the second lateral surface 72 of the blade 38. The textured area 102 is positioned on the second lateral surface 72 of the blade 38 between the proximal end 94 and the distal end 96 of the blade 38. In certain embodiments, the textured area 102 is positioned on the second lateral surface 72 of the blade 38 between the closed end surface 32 (e.g., an intersection between the closed end surface 32 and the second lateral surface 72) and the proximal end 94 of the blade 38. Generally, the textured area 102 may be sized and positioned to diffuse the light emitted by the light emitter 62 of FIG. 2 to thereby reduce glare in the images captured by the camera 58 of FIG. 2.

The textured area 92 in FIG. 3 and the textured area 102 in FIG. 4 may both be present on the blade 38. Advantageously, the textured areas 92, 102 may be readily incorporated into the first and second lateral surfaces 70, 72, respectively, during a manufacturing process. For example, the blade 38 may be formed via an injection molding manufacturing process. During the injection molding manufacturing process, a fluid blade material (e.g., acrylic, plastic) may be injected into an interior space of a mold, and then the fluid blade material may be cooled to cause the fluid blade material to harden into the blade 38 having a shape that the corresponds to the interior space of the mold. The interior space of the mold may be formed to have a corresponding texture to cause the textured areas 92, 102 on the first and second lateral surfaces 70, 72, respectively, as the fluid blade cools and hardens into the blade 38. Importantly, the interior space of the mold may be formed to have the corresponding texture to cause the textured areas 92, 102 to be on the first and second lateral surfaces 70, 72, respectively, because the first and second lateral surfaces 70, 72 are both generally perpendicular (e.g., orthogonal, transverse) to a draw direction of the mold (e.g., a direction of movement of the mold as the mold is separated from the blade 38; represented by arrows 104). That is, the first and second lateral surfaces 70, 72 extend generally vertical, and the draw direction of the mold is generally lateral. This placement may facilitate separation of the blade 38 from the mold after the blade 38 is formed within the interior space of the mold without compromising the textured areas 92, 102.

Due at least in part to constraints on the injection molding manufacturing process (e.g., due to the potential for adverse effects to any textured areas along surfaces that are generally parallel to the draw direction), for example, the textured areas 92, 102 on the first and second lateral surfaces 70, 72, respectively, may be the only textured areas on the blade 38 (or the first and second lateral surfaces 70, 72 may be the only surfaces of the blade 38 that have texture, such as the textured areas 92, 102). In such cases, a remainder of the blade 38 may have an untextured (e.g., relatively untextured) and/or smooth (e.g., relatively smooth, glossy) surface finish.

However, it should be appreciated that one or more additional glare-reducing features may be provided on one or more other surfaces of the blade 38, such as on an upper surface 110 of the blade 38 and/or a lower surface 112 of the blade 38. In such cases, the one or more additional glare-reducing features may include respective textured areas on the upper surface 110 of the blade 38 and/or the lower surface 112 of the blade 38. The respective textured areas on the upper surface 110 of the blade 38 and/or the lower surface 112 of the blade 38 may be positioned between the proximal end 94 and the distal end 96 of the blade 38. In certain embodiments, the respective textured areas on the upper surface 110 of the blade 38 and/or the lower surface 112 of the blade 38 may be positioned between the closed end surface 32 and the proximal end 94 of the blade 38. Generally, the respective textured areas on the upper surface 110 of the blade 38 and/or the lower surface 112 of the blade 38 may be sized and positioned to diffuse the light emitted by the light emitter 62 of FIG. 2 to thereby reduce glare in the images captured by the camera 58 of FIG. 2. When present together, the textured areas 92, 102 and the textured areas on the upper surface 110 of the blade 38 and/or the lower surface 112 of the blade 38 may form a substantially continuous loop about the blade 38 (e.g., to circumferentially surround the blade 38 (e.g., to thereby circumferentially surround the gap 84 shown in FIG. 2).

The respective textured areas on the upper surface 110 of the blade 38 and/or the lower surface 112 of the blade 38 may be formed during the injection molding manufacturing process, even though the upper and lower surfaces 110, 112 are generally parallel to the draw direction. Alternatively, the mold may be modified such that the upper and lower surfaces 110, 112 are generally perpendicular to the draw direction. In certain embodiments, the respective textured areas on the upper and lower surfaces 110, 112 may be the only textured areas on the blade 38 (or the upper and lower surfaces 110, 112 may be the only surfaces of the blade 38 that have texture, such as the respective textured areas). In such cases, a remainder of the blade 38 may have an untextured (e.g., relatively untextured) and/or smooth (e.g., relatively smooth, glossy) surface finish.

It should also be appreciated that the textured areas 92, 102, or any other textured area(s) on the blade 38, may be formed via any of a variety of other suitable processes. For example, the textured areas 92, 102, or any other textured area(s) on the blade 38, may be formed after the injection molding manufacturing process (e.g., after the blade 38 is removed from the mold) via any of a variety of texturing techniques, such as by blasting (e.g., sand-blasting), etching (e.g., chemical etching), or sparking (e.g., spark erosion) on appropriate portions of the blade 38. Furthermore, one or more textured areas may be formed via the corresponding texture in the interior space of the mold during the injection molding manufacturing process and one or more textured areas may be formed after the injection molding manufacturing process. For example, the textured areas that are positioned on surfaces of the blade 38 that are generally perpendicular to the draw direction may be formed via the corresponding texture in the interior space of the mold during the injection molding manufacturing process, and the textured areas that are positioned on surfaces of the blade 38 that are generally parallel to the draw direction may be formed after the injection molding manufacturing process.

Figure 5:
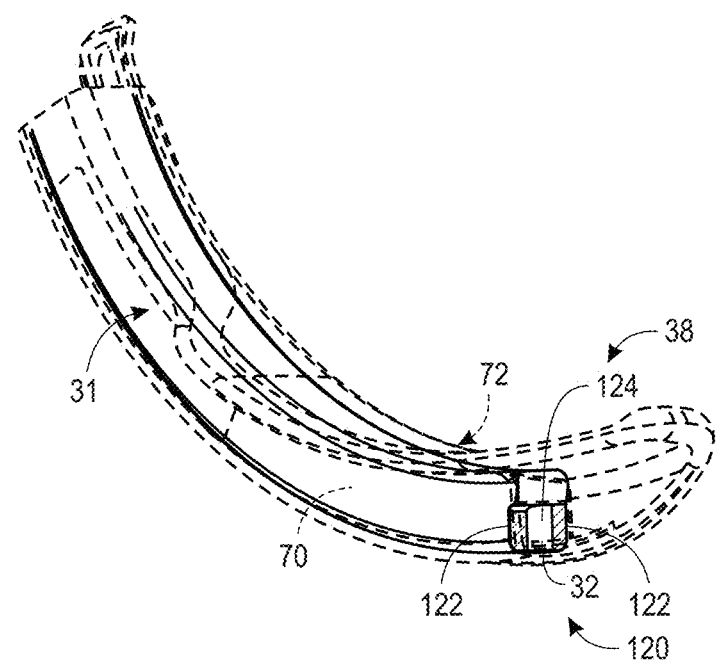
FIG. 5 is a perspective right side view of the blade FIG. 2, wherein the blade includes a third textured surface, in accordance with an embodiment of the present disclosure.

FIG. 5 is a perspective right side view of an embodiment of the blade 38, wherein the blade 38 includes a third glare-reducing feature 120 on the closed end surface 32 of the blade 38. In the illustrated embodiment, the third glare-reducing feature 120 is a textured area 122 located across a portion of the closed end surface 32 of the blade 38. The textured area 122 is positioned on the closed end surface 32 of the blade 38 between the first lateral surface 70 and the second lateral surface 72 of the blade 38. To facilitate visualization of the textured area 122, only interior surfaces that define interior surfaces of the passage 31 of the blade 38 and the closed end surface 32 are shown in solid lines. Other surfaces of the blade 38, such as the first lateral surface 70 and the second lateral surface 72 of the blade 38, are shown in dashed lines.

In certain embodiments, the textured area 122 is arranged on opposite laterals sides of an untextured area 124 of the closed end surface 32. The untextured area 124 may be positioned to enable light from the light emitter 62 of FIG. 2 to pass through the untextured area 124 to illuminate the patient's airway and/or to enable the camera 58 of FIG. 2 to capture the images of the patient's airway through the untextured area 124. While the textured area 122 is illustrated as having two separate portions on the opposite lateral sides of the untextured area 124, it should be appreciated that the textured area 122 may entirely circumferentially surround the untextured area 124. Furthermore, the textured area 122 may be configured to enable light transmission through the textured area 122 (while also diffusing light), and thus, the textured area 122 may be positioned in front of the light emitter 62 so that the light emitted by the light emitter 62 passes through and is diffused by the textured area 122 to both provide sufficient light for the camera 58 to capture the images of the patient's airway and reduce glare in the images. Generally, the textured area 122 may be sized and positioned to diffuse the light emitted by the light emitter 62 of FIG. 2 to thereby reduce glare in the images captured by the camera 58 of FIG. 2.

The textured area 122 may be generated using any of the texturizing techniques disclosed herein, such as via the corresponding texture on the interior space of the mold, blasting, etching, or sparking. An internally-facing portion of the closed end surface 32 may be generally perpendicular to the draw direction of the mold. Thus, when the textured area 122 is provided on the internally-facing portion of the closed end surface 32, it may be desirable to form the textured area 122 via the corresponding texture on the interior space of the mold. However, an externally-facing portion of the closed end surface 32 may be generally parallel to the draw direction of the mold and/or it may be difficult to provide the corresponding texture on the interior space of the mold due to the geometry of the mold. Thus, when the textured area 122 is provided on the externally-facing portion of the closed end surface 32, it may be desirable to form the textured area 122 via blasting, etching, sparking, or the like after the injection molding manufacturing process.

Each of the textured areas described herein may have a textured profile (e.g., surface profile). The textured areas may have a roughened surface (e.g., not smooth) due to cross-hatching, grooves, indentations, depressions, or any of a variety of three-dimensional features. In particular, each of the textured areas may have notable surface variations (e.g., peaks and valleys). For example, a roughness average (Ra) of the textured area may be greater than a Ra of a mirror finish (e.g., greater than a Ra of 0.1 micrometers [μm]). In certain embodiments, the Ra of the textured area may be between approximately 5 and 40 μm. In contrast, other portions of surfaces of the blade 38 may be generally untextured or smooth with a lower Ra (as compared to the textured areas), such as a Ra between approximately 0.025 and 0.18 μm. Other values are envisioned as well, such as the Ra of the textured area being greater than 0.2, 0.3, 0.4, 0.5, 1, 2, 3, 4, 5, 6, 7, or 8 μm, or the Ra of the textured area being between approximately 0.2 to 40 μm, 1 to 30 μm, or 10 to 20 μm. Furthermore, the Ra for the portions of surfaces of the blade 38 that are generally untextured or smooth may be less than 0.5, 0.4, 0.3, 0.2, 0.1, 0.05 μm, or the Ra for the portions of surfaces of the blade 38 that are generally untextured or smooth may be between and 0.01 to 0.5 μm or 0.1 to 0.2 μm.

A respective boundary may surround each of the textured areas to define and to separate the textured area from any adjacent untextured area(s)(e.g., non-textured areas, smooth areas). Indeed, the textured areas may be different to the touch and/or visibly different in appearance from the adjacent untextured areas (e.g., to the user). It should be appreciated that the textured areas may have a surface structure that provides light diffusion (e.g., multi-directional reflection of the light; light scattering). The surface structure may also affect (e.g., reduce, as compared to the adjacent untextured areas) a level of transparency, such as by reflecting light in a manner that effectively blocks some or all light from passing through the textured areas of the blade 38. Indeed, the textured areas may be opaque and block all light from passing through the textured areas of the blade 38, or substantially opaque and block a substantial amount (e.g., at least 25 percent, 50 percent, 75 percent, 90 percent or more) of incident light from passing through the textured areas of the blade 38.

While the one or more glare-reducing features are described as being textured areas, it should be appreciated that the one or more glare-reducing features may be a coated area. For example, one or more of the textured areas 92, 102, 122 shown in FIGS. 3-5 may instead be a coated area formed via application of a coating to the first lateral surface 70, the second lateral surface 72, or the closed end surface 32, respectively. The coating may be a paint (e.g., dark paint, such as black paint) applied after the injection molding manufacturing process, or the coating may be a foil that is applied during the injection molding manufacturing process. For example, the foil may be positioned in the interior space of the mold, then the fluid blade material may be injected into the interior space of the mold, and the foil may be formed into the blade 38 as the fluid blade material cools within the interior space of the mold. It should be appreciated that the coated areas may provide light diffusion (e.g., multi-directional reflection of the light; light scattering). The coated areas may also affect (e.g., reduce, as compared to the adjacent uncoated areas) a level of transparency, such as by absorbing light in a manner that effectively blocks some or all light from passing through the coated areas of the blade 38. Indeed, the coated areas may be opaque and block all light from passing through the coated areas of the blade 38, or substantially opaque and block a substantial amount (e.g., at least 25 percent, 50 percent, 75 percent, 90 percent or more) of incident light from passing through the coated areas of the blade 38.

It should be appreciated that one or more textured areas may be used in combination with one or more coated areas on the blade 38. For example, textured areas may be present on surfaces of the blade 38 that are generally orthogonal to the draw direction, while coated areas may be present on surfaces of the blade 38 that are generally parallel to the draw direction. In the illustrated embodiment, this may result in the textured areas 92, 102 on the first and second lateral surfaces 70, 72, respectively, and coated areas being on the upper surface 110, the lower surface 112, and/or the closed end surface 32. Furthermore, one or more textured areas may also be coated areas (e.g., the coating is applied over the textured area).

Figure 6:
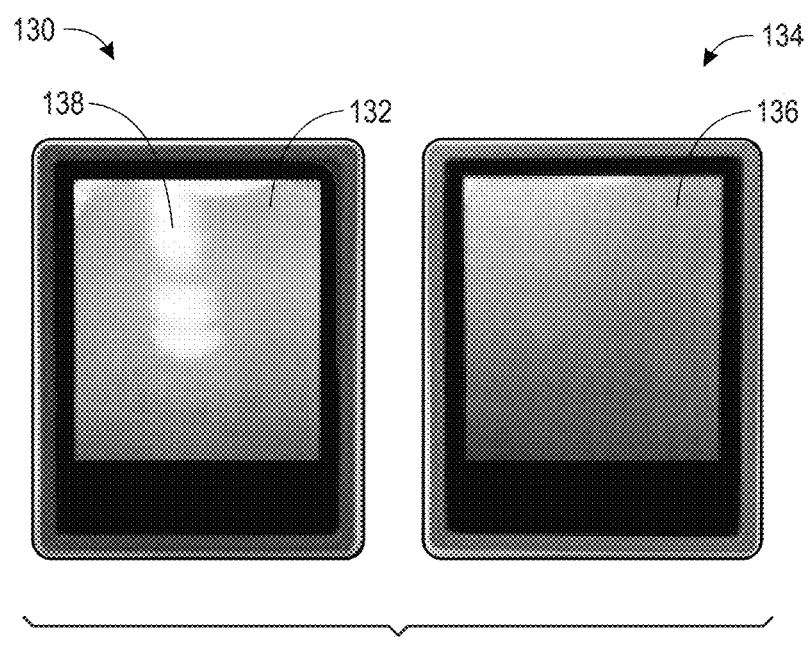
FIG. 6 illustrates example displays of a first image obtained through the blade without any textured surface and a second image obtained through the blade with at least one textured surface, in accordance with an embodiment of the present disclosure.

FIG. 6 shows an example of a first display 130 of a first image 132 obtained through a blade without any textured surface and an example of a second display 134 of a second image 136 obtained through a blade with at least one textured surface, such as the blade 38 of FIGS. 3-5, in accordance with an embodiment of the present disclosure. As shown, the first display 130 of the first image 132 has substantial glare 138, while the second display 134 of the second image 136 is devoid of the substantial glare 138. It should be appreciated that the first display 130 of the first image 132 and the second display 134 of the second image 136 are merely exemplary and are provided to facilitate discussion of glare reduction that may be provided by the one or more glare-reducing features disclosed herein. For example, while the substantial glare 138 is shown as extend from an upper portion to a center portion of the first display 130, the substantial glare 138 may be in other location(s) of the first display 130 and/or may be changed or reduced in other way(s) in the second display 134.

While the disclosure may be susceptible to various modifications and alternative forms, specific embodiments have been shown by way of example in the drawings and have been described in detail herein. However, it should be understood that the embodiments provided herein are not intended to be limited to the particular forms disclosed. Rather, the various embodiments may cover all modifications, equivalents, and alternatives falling within the spirit and scope of the disclosure as defined by the following appended claims. Further, it should be understood that certain elements of the disclosed embodiments may be combined or exchanged with one another. Numerical terms, such as "first," "second," and "third" may be used to distinguish components to facilitate discussion, and it should be noted that the numerical terms may be used differently or refer to different elements in the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A laryngoscope system, comprising:
   a body comprising a handle and an arm;
   a light source, positioned at a distal end of the arm, configured to emit light;
   a camera, positioned at the distal end of the arm, configured to obtain image data; and
   a laryngoscope blade comprising a channel sized to fit over the light source and the camera, wherein the channel comprises:
      a closed end surface at a distal end of the channel;
      an upper surface extending from the closed end surface;
      a lower surface extending from the closed end surface;
      a lateral surface extending from the closed end surface and connected to the upper surface and the lower surface; and
      a glare-reducing texture or a glare-reducing coating applied to a portion of the lateral surface extending from the position of the camera to a distal end of the closed end surface.

2. The laryngoscope system of claim 1, wherein the channel comprises the glare-reducing texture applied to the lateral surface, and the glare-reducing texture comprises a roughness average greater than 5 micrometers.

3. The laryngoscope system of claim 1, wherein the channel comprises:
   the glare-reducing texture applied to the lateral surface; and
   an untextured area proximally adjacent to the glare-reducing texture applied to the lateral surface;
   wherein the glare-reducing texture comprises a first roughness average, and the untextured area comprises a second roughness average that is less than the first roughness average.

4. The laryngoscope system of claim 1, wherein the channel comprises:
   an additional lateral surface; and
   an additional glare-reducing texture or an additional glare-reducing coating applied to the additional lateral surface.

5. The laryngoscope system of claim 1, wherein, when the channel is fitted over the light source and the camera, the light source is configured to emit the light through the closed end surface, and the camera is configured to obtain the image data through the closed end surface.

6. The laryngoscope system of claim 5, wherein the channel comprises an additional glare-reducing texture or an additional glare-reducing coating applied to the closed end surface.

7. The laryngoscope system of claim 1, wherein the channel comprises the glare-reducing texture applied to the lateral surface, and the glare-reducing texture is positioned along a portion of the channel between a proximal end of the channel and the closed end surface.

8. The laryngoscope system of claim 1, wherein the channel comprises the glare-reducing coating applied to the lateral surface, and the glare-reducing coating is a paint or a foil.

9. The laryngoscope system of claim 1, wherein the glare-reducing texture or the glare-reducing coating cause at least one of a reduction of reflection of the light emitted by the light source or increase diffusion of the light emitted by the light source.

10. The laryngoscope system of claim 1, wherein the closed end surface comprises:
    a first portion extending along a first axis; and
    a second portion extending along a second axis, wherein the second axis is positioned at an angle different than that of the first axis.

11. A laryngoscope system, comprising:
    a body comprising a handle and an arm;
    a light source positioned at a distal end portion of the arm;
    a camera positioned at the distal end portion of the arm; and
    a laryngoscope blade comprising:
       a channel sized to fit over the arm;
       a closed end surface that is configured to enable light from the light source to pass through the closed end surface of the channel and to enable the camera to obtain image data through the closed end surface of the channel while the channel is fitted over the arm;
       a first lateral surface and a second lateral surface positioned on opposite lateral sides of the closed end surface, wherein the first lateral surface and the second lateral surface extend from a distal end portion of the arm towards a distal end of the laryngoscope blade;
       a glare-reducing texture applied to the closed end surface, the first lateral surface, the second lateral surface, or any combination thereof; and
       an untextured area, wherein the glare-reducing texture has a first roughness average, and the untextured area has a second roughness average that is less than the first roughness average.

12. The laryngoscope system of claim 11, wherein:
    the glare-reducing texture extends across a gap between the distal end portion of the arm and the closed end surface; and
    a remainder of a proximal portion of the laryngoscope blade does not include the texture.

13. The laryngoscope system of claim 11, wherein the glare-reducing texture comprises a roughness average greater than 5 micrometers.

14. The laryngoscope system of claim 11, wherein the laryngoscope blade comprises the glare-reducing texture applied to the first lateral surface and the second lateral surface.

15. The laryngoscope system of claim 14, wherein the laryngoscope blade comprises a glare-reducing coating on at least a portion of the closed end surface.

16. A blade for a laryngoscope, the blade comprising:
- a blade body that defines a channel sized to receive a camera stick of the laryngoscope;
- a closed end surface, at a distal end of the channel, that is configured to enable light from a light source to pass through the closed end surface of the channel;
- a first lateral surface and a second lateral surface positioned on opposite lateral sides of the closed end surface, wherein the first lateral surface and second lateral surface extend towards a distal end of the laryngoscope blade; and
- a glare-reducing texture or a glare-reducing coating applied to the first lateral surface and the second lateral surface.

17. The blade of claim 16, wherein the blade comprises the glare-reducing texture, and the glare-reducing texture comprises a roughness average greater than 5 micrometers.

18. The blade of claim 16, wherein the blade comprises the glare-reducing coating, and the glare-reducing coating comprises a paint or a foil.

19. The blade of claim 16, wherein a portion of the first lateral surface or the second lateral surface does not include the glare-reducing texture or a glare-reducing coating.

\* \* \* \* \*